United States Patent [19]

Verbeke

[11] 4,118,912

[45] Oct. 10, 1978

[54] METHOD OF SECURING A COMMODITY IN A PLASTIC BAG

[76] Inventor: Henry Verbeke, Tannersbrook Rd., Chester, N.J. 07930

[21] Appl. No.: 769,076

[22] Filed: Feb. 16, 1977

Related U.S. Application Data

[62] Division of Ser. No. 572,363, Apr. 28, 1975, Pat. No. 4,031,815.

[51] Int. Cl.² .............................................. B31B 1/86
[52] U.S. Cl. ...................................... 53/469; 93/35 H
[58] Field of Search .................. 93/35 H, 33 H, 33 R, 93/35 R, 8 WA; 53/14, 134; 156/515, 583

[56] References Cited

U.S. PATENT DOCUMENTS

| | | | |
|---|---|---|---|
| 3,568,576 | 3/1971 | Lehmacher et al. | 93/35 H |
| 3,720,141 | 3/1973 | Stock | 93/35 H X |
| 3,803,990 | 4/1974 | Pedersen | 93/35 H |
| 3,869,842 | 3/1975 | Verbeke | 93/27 X |

FOREIGN PATENT DOCUMENTS

| | | | |
|---|---|---|---|
| 2,157,072 | 6/1973 | Fed. Rep. of Germany | 93/35 H |
| 6,916,334 | 5/1971 | Netherlands | 93/35 H |

*Primary Examiner*—James F. Coan
*Attorney, Agent, or Firm*—Caesar, Rivise, Bernstein & Cohen, Ltd.

[57] ABSTRACT

A method of forming a handle on a plastic bag comprising forming an opening in the top of the bag by heat cutting the opening, said heat cutting removing a portion of the front wall and rear wall of the bag and heat sealing the front wall to said rear wall at the opening. A purchased commodity is placed in the bag before the handle is formed and the heat cutting operation serves the function of forming the handle and sealing the top of the bag closed.

8 Claims, 9 Drawing Figures

METHOD OF SECURING A COMMODITY IN A PLASTIC BAG

This application is a division of application Ser. No. 572,363, filed on Apr. 28, 1975, now U.S. Pat. No. 4,031,815.

This invention relates to a handle forming apparatus, and more particularly, to a novel method and apparatus for sealing and forming a handle in a plastic bag, and to the plastic bag formed by said method and apparatus.

Many retailers now package vended goods in plastic bags. These bags are attractive in appearance, are waterproof and are generally quite durable. However, one of the problems that most of the plastic bags have in common is that there is no durable, yet inexpensive, carrying handle. Most of the plastic bags that have been available to date are provided with one of three types of handles, that is, a die cut handle, a die cut and reinforced handle, or a separate fabricated handle attached to the bag, either mechanically or by heat sealing.

The die cut handle comprises a cut that is formed in the plastic of the bag. This handle is inexpensive, but since the plastic is high in tensile strength and low in shear strength, the die cut reduces the carrying capacity of the bag and makes its use very limited. Thus, if substantial weights are placed in the bag, it has been found that the bag will tear at the portion that has been die cut.

An example of a die cut handle in a plastic bag can be found in U.S. Pat. No. 3,720,141. The handle cut in the bag of this patent is quite satisfactory for carrying relatively light loads in the plastic bag. However, the bag having a handle formed according to the method of the instant invention can carry loads three times as heavy as a bag formed utilizing the handle disclosed in U.S. Pat. No. 3,720,141.

The reinforced die cut handle consists of a folded film that is heat sealed to the rim of the die cut slot in the bag. This handle has adequate shear strengh, but the cost of the reinforcement is sometimes as high as the cost of the bag itself.

Likewise, the separate handles do have sufficient strengh to withstand substantial weights placed in the bag. The difficulty in attaching these handles, however, increases the price even more than the reinforced die cut handles.

All of the problems of the handles and plastic bags mentioned above were overcome by utilizing the plastic bag with the integral handle disclosed in my prior U.S. Pat. No. 3,858,789, the disclosure of which patent is incorporated by reference herein. The bag of the instant invention possesses all of the advantages of the bag disclosed in U.S. Pat. No. 3,858,789, while in addition providing novel advantages of its own. The bag of this invention includes an inexpensively formed integral handle which is both strong and easy to manufacture. Additionally, when forming the handle, the contents of the bag are sealed in place. Therefore, the bag can be used as an effective deterrent to a shoplifter, since the security guard in a store can check to determine whether all bags leaving the store are still sealed at the handle of the bag.

The bag of this invention is provided with an opening which has the same appearance as the die cut opening. The advantage of this type of structure over that disclosed in U.S. Pat. No. 3,858,789 is that a number of bags can conveniently be carried in one hand by aligning the openings in all of the bags. Although it is possible to carry a number of bags in one hand utilizing the handle disclosed in U.S. Pat. No. 3,858,789, this requires a nesting arrangement, and may not be as confortable as placing the hand through aligned openings in bags.

In another aspect of this invention, a novel method and apparatus for forming the handles and sealing the bags are disclosed. Accordingly, the method and apparatus of this invention comprise an improvement on the method and apparatus disclosed in my prior U.S. Pat. No. 3,869,842, the disclosure of which is incorporated by reference herein. The method and apparatus disclosed in said prior U.S. Pat. No. 3,869,842 formed the bag of U.S. Pat. No. 3,858,789. The method and apparatus of this invention are used to form the bag of this invention.

It is accordingly an object of this invention to provide a novel plastic bag.

It is another object of this invention to provide a plastic bag having a novel handle.

It is a further object of this invention to provide a method of forming a handle on a plastic bag.

It is yet a further object of this invention to provide an apparatus for sealing a plastic bag and forming a handle at the top thereof.

These and other objects of this invention are accomplished by providing a plastic bag comprising a rear wall, a front wall, a closed bottom and a handle on said bag, said handle comprising an opening formed at the top of said bag, said opening having a heat-sealed bead around its perimeter, said heat sealed bead joining said front wall to said rear wall at said opening.

Other objects and many of the attendant advantages of this invention will be readily appreciated as the same becomes better understood by reference to the following detailed description when considered in connection with the accompanying drawings wherein:

Figure 1:
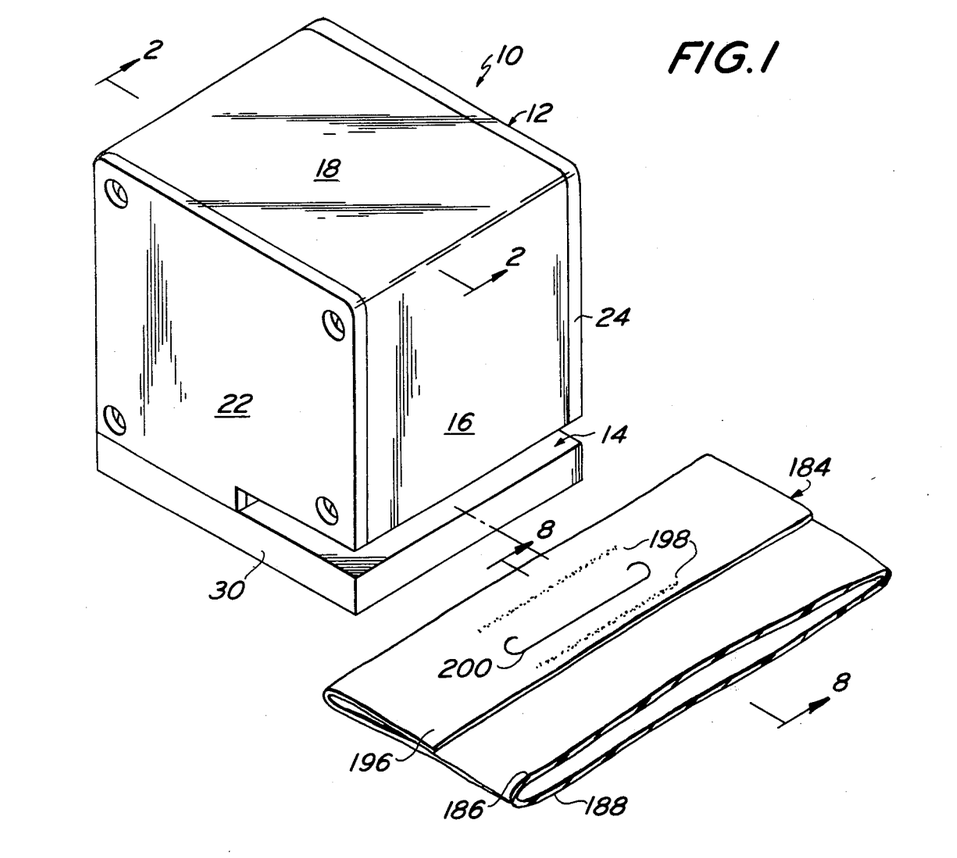
FIG. 1 is a perspective view of the handle forming apparatus of this invention and a bag, partially broken away, that has been sealed and had a handle formed therein by said apparatus.

Referring now in greater detail to the various figures of the drawings wherein like reference characters refer to like parts, a handle forming apparatus embodying the present invention is generally shown at 10 in FIG. 1. Device 10 basically comprises a housing 12 having a bag receiving opening 14 formed therein.

Figure 2:
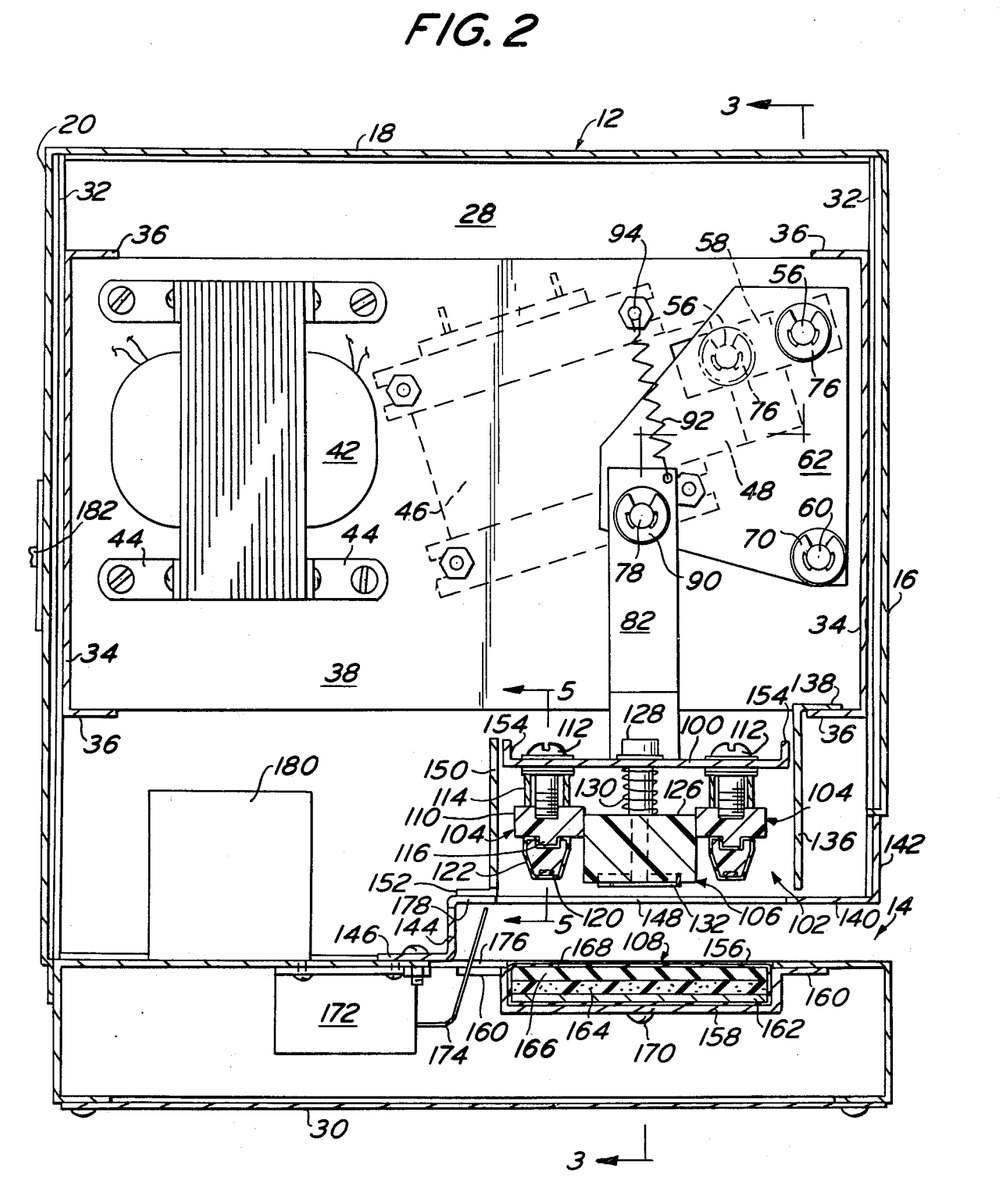
FIG. 2 is an enlarged sectional view taken along the line 2—2 of FIG. 1.

Referring to FIGS. 1 to 4, it is seen that housing 12 includes a front wall 16, a top wall 18, a rear wall 20 and side plates 22 and 24. Side plates 22 and 24 are in turn bolted to said walls 26 and 28, respectively. Housing 12 further includes a hollow base 30. Interior side walls 26 and 28 include inwardly projecting, vertically extending flanges 32. As seen in FIG. 2, vertically extending plates 34, having top and bottom flanges 36, are secured to flanges 32, as by welding.

A plate 38 extends between plates 34 (FIG. 2) and includes flanges 40 (FIG. 3) which are secured to plate 34 and its associated flanges 36. A transformer 32 is secured to plate 38 by L-shaped brackets 44 (FIG. 2) and associated bolts. A solenoid 46 is mounted on plate 38 on the side opposite transformer 42 (FIG. 2). The solenoid includes a T-shaped plunger 48. As seen in FIG. 2, the solenoid and its plunger project upwardly at an angle relative to a horizontal plane through plate 38.

Plunger 48 includes a pair of spaced ears 50 (FIG. 3) at the front thereof. A stud 52 (FIG. 3) is mounted between ears 50, and is secured in place by bolt 54. Stud 52 includes a pin 56 of reduced diameter that projects through an opening 58 in plate 38. As seen in FIG. 2, opening 58 is inclined at the same angle as solenoid 46 and its associated plunger 48.

Figure 6:
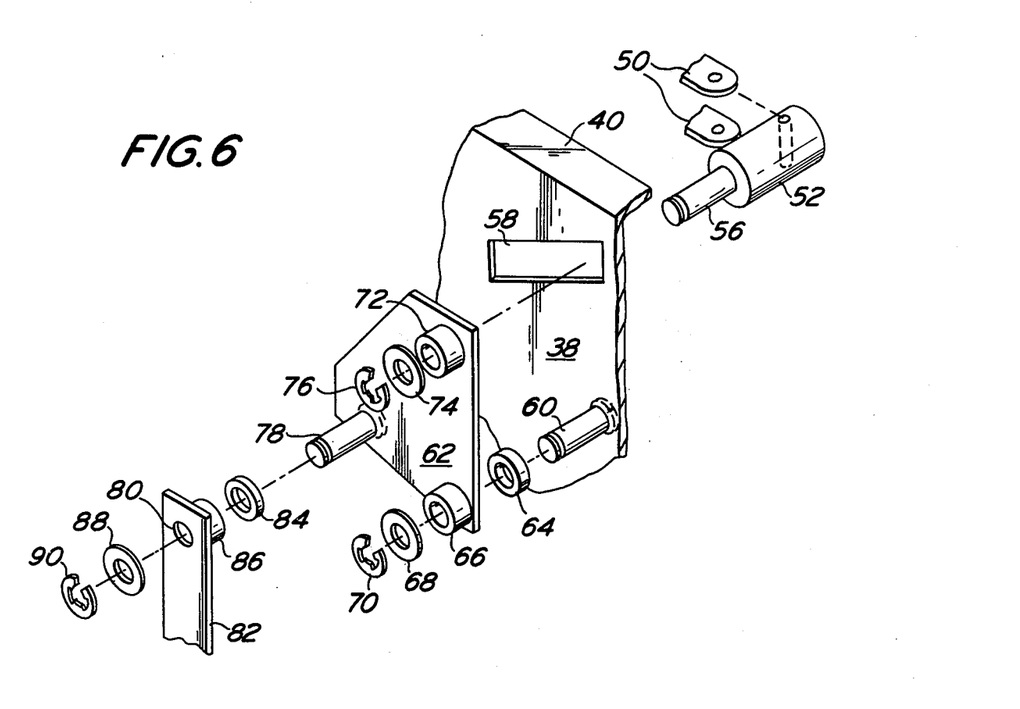
FIG. 6 is a partial exploded view of the elements comprising the mechanism for raising and lowering the heat sealing and cutting assembly.

The actuating mechanism for raising and lowering the heat sealing and cutting assembly of this invention is partially shown in FIG. 6. Referring to FIG. 6, the opening 58 is shown in plate 38. A pin 60 is secured in plate 38 and projects horizontally outward therefrom. A plate 62 is rotatably mounted on pin 60. Plate 62 lies parallel to plate 38, and is spaced therefrom by spacer 64. The pin passes through a bushing 66, and the plate 62 is secured in place by a washer 68 and a collar 70.

Pin 56 passes through opening 58, and through bushing 72 in plate 62. A washer 74 is telescoped over pin 56 and is secured in place by collar 76.

A pin 78 projects horizontally outward from plate 62. Pin 78 is rotatably received in opening 80 of bar 82. Bar 82 is spaced from plate 62 by spacer 84. Pin 78 passes through bushing 86 on bar 82, and is secured in place by washer 88 and collar 90. As seen in FIG. 2, a tension spring 92 connects bar 82 with one of the bolts 94 securing the solenoid 46 in place.

Figure 3:
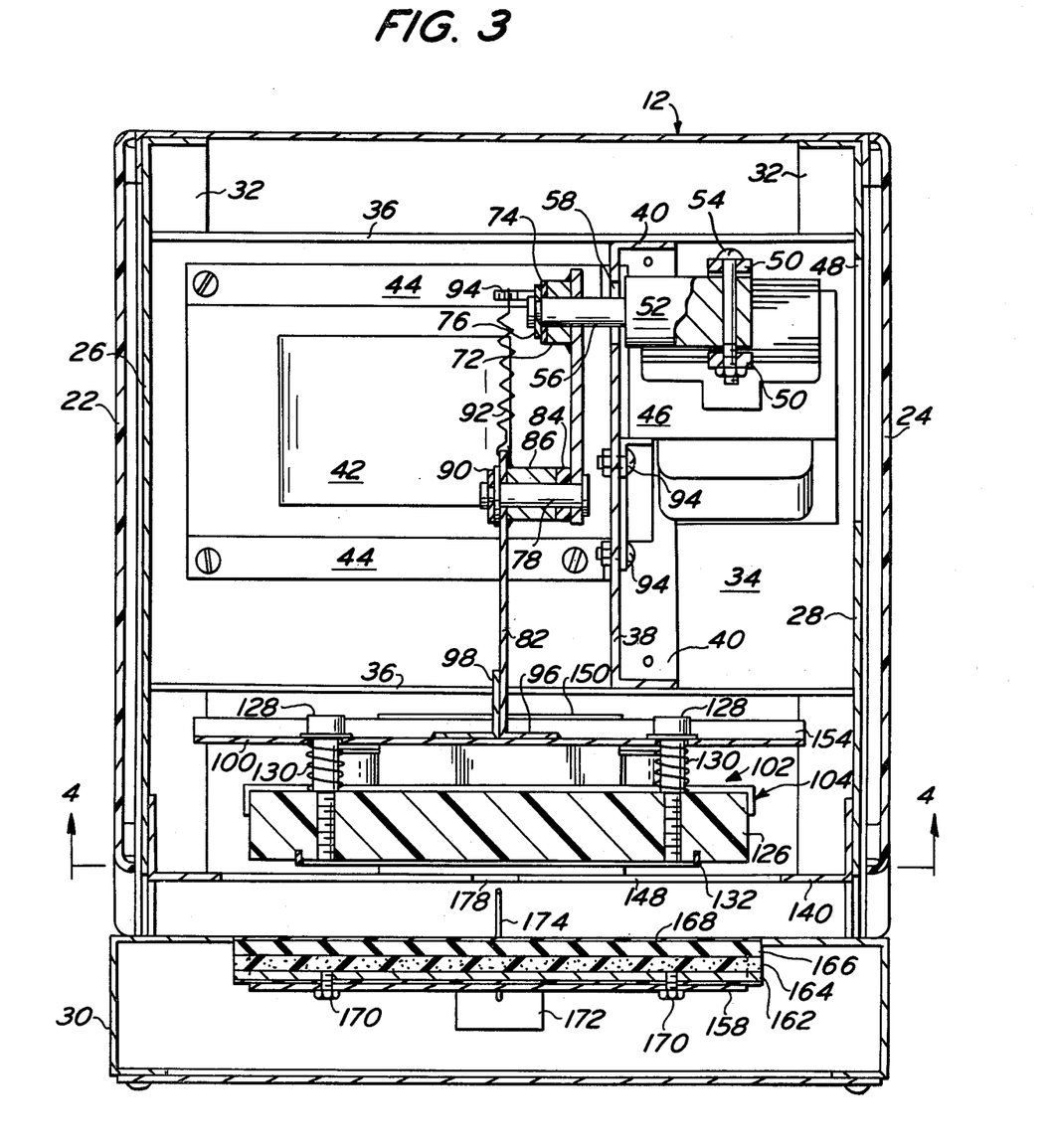
FIG. 3 is a sectional view taken along the line 3—3 of FIG. 2.

As seen in FIG. 3, bar 82 includes a lower flange 96. An L-shaped bracket 98 is welded to the bottom of bar 82. The horizontal leg of bracket 98 and flange 96 are in turn welded to plate 100. Plate 100, in turn, supports the heat sealing and cutting assembly, which is generally shown at 102 in FIGS. 2, 3 and 4. Assembly 102 includes a pair of spaced heat sealers 104, a heat sealer and cutter 106 and a platen or backing plate 108.

Figure 5:
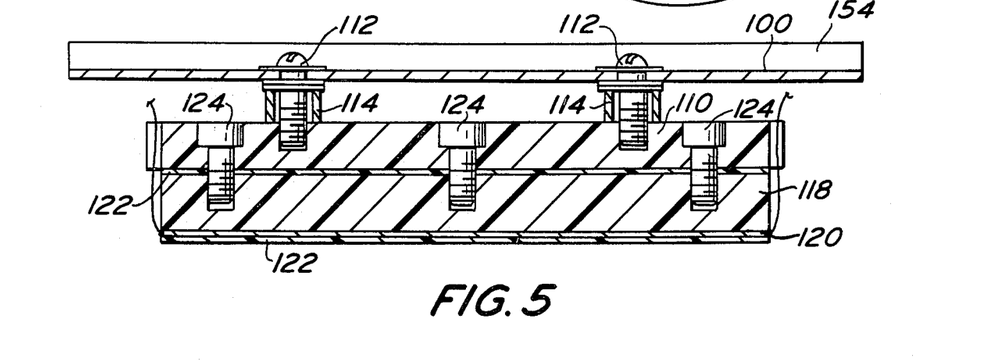
FIG. 5 is a sectional view taken along the line 5—5 of FIG. 2.

Each heat sealer 104 is the same as the heat sealers disclosed in my aforementioned U.S. Pat. No. 3,869,842. Each heat sealer includes an elongated bar 110 that extends laterally across the device. Bar 110 is secured to plate 100 by a pair of bolts 112 (FIGS. 2 and 5). Spacer rings 114 space the bar 110 from plate 112, and washers are associated with the bolts 112. The bolts 112 are threadedly secured in bar 110.

Bar 110 includes a downwardly projecting rib 116. Rib 116 is received in a horizontally extending slot in sealer bar 118. A heating ribbon 120 is received in a slot in the bottom of bar 118, and extends for the length of the bar. A sleeve 122 covers the entire sealer bar 118. Sleeve 122 can be any of the heat sealer sleeves known to the art. By way of example, it can comprise polytetrafluoroethylene (Teflon) covered fiberglass. The purpose of the polytetrafluoroethylene is to prevent any sticking of the heat sealer bars to the plastic of the bag at the time the bag is heat sealed, as is well known in the art.

The bar 110 is secured to the sealer bar 118 by a plurality of bolts 124 (FIG. 5). As seen in FIG. 5, a plurality of holes are drilled in the top of bar 110, with smaller diameter holes passing through the bottom of the bar. A bolt 124 is positioned in each hole and is threadedly secured in bar 118. A number of the holes are provided in order to insure rigid securement of the bar 110 to the bar 118, and in order to maintain sleeve 122 in place, which sleeve is held in a taut condition by rib 116 being received in the upper slot of sealer bar 118. Both heat sealers 104 are identical in structure, and the description of one of these heat sealers applies equally to the other heat sealer.

Figure 4:
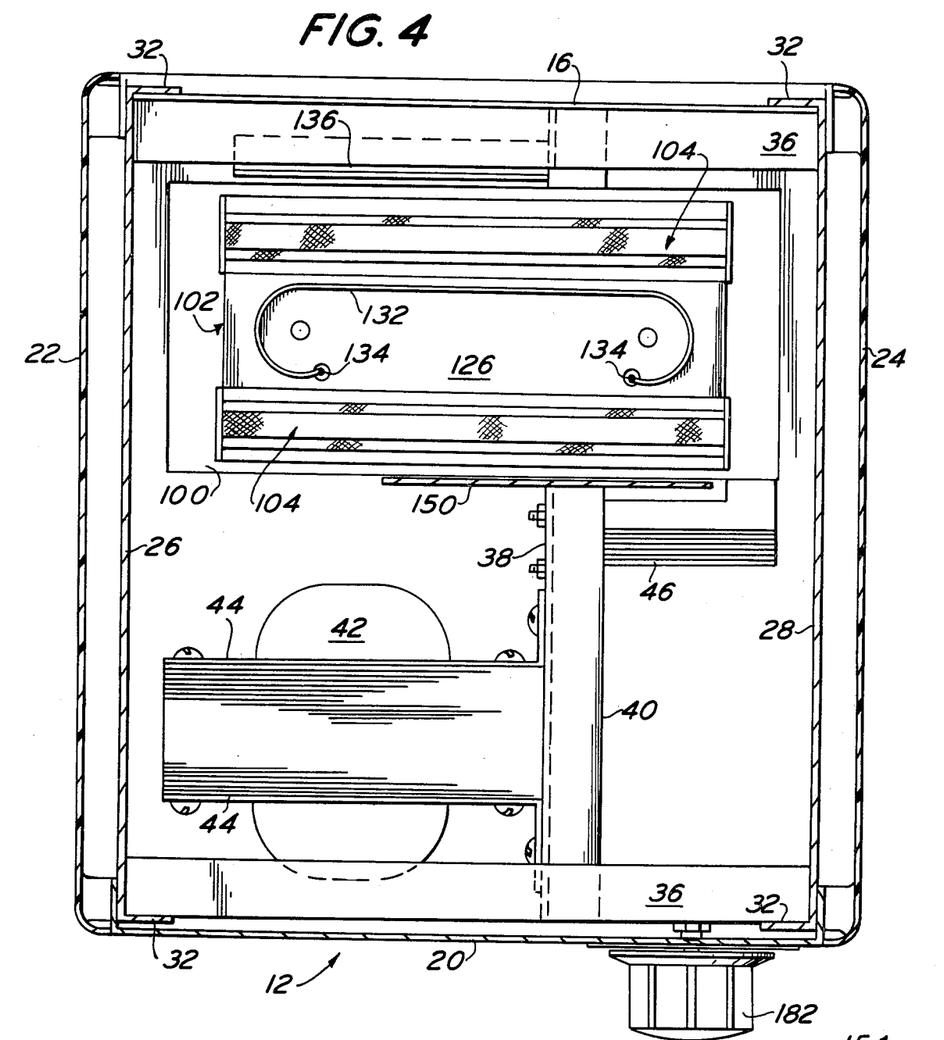
FIG. 4 is a sectional view taken along the line 4—4 of FIG. 3.

The heat sealer and cutter 106 is positioned between the heat sealers 104 (FIG. 2). Device 106 comprises a rectangular block of insulating material, such as a phenolic plastic, 126. Block 126 is positioned between heat sealers 104, and is freely slidable vertically relative to the heat sealers 104, which are rigidly fixed in place. A pair of bolts 128 (FIG. 3) pass through enlarged openings in plate 100 and are threadedly secured in block 126. A compression spring 130 is telescoped over each bolt 128, and bears against the top of block 126 and the bottom of plate 100. Bolts 128 are vertically reciprocable in the openings in plate 100, and as the bolts move vertically, the block 126 moves vertically therewith. The springs 130 urge the block 126 to the position shown in FIG. 3. A flat wire 132 (FIG. 3) is secured in block 126, and projects partially downwardly from the bottom of the block. As seen in FIG. 4, the wire 132 is in the shape of a partial loop, and includes spaced termini 134. Wire 132 can be provided with an anti-stick surface, such as a thin film of polytetrafluoroethylene. Likewise, the underside of block 126 can be provided with a sheet of polytetrafluoroethylene covered fiberglass adhesively secured thereto for anti-stick properties.

A vertically extending plate 136 (FIG. 2) is secured on the lower flange 36 of forward plate 34 by flange 138 and appropriate welding. A horizontal plate 140 (FIG. 2) forms the upper surface of slot or opening 14. Plate 140 includes a flange 142 that is secured to flanges 32 of the side walls 26 and 28. Plate 140 also includes a rear flange 144, which serves as the back wall of slot 14. Rear flange 144 in turn includes a horizontally extending flange 146, which is bolted to the top of base 30. Plate 140 includes a rectangular opening 148 through which cutter and sealer assembly 102 can pass.

A vertically extending plate 150 (FIG. 2) is secured on plate 140 by a flange 152 and appropriate welding. Plates 136 and 150 serve as guides for the vertical reciprocation of the assembly 102. The aid in providing a smooth reciprocation of the assembly, plate 100 includes flanges 154 at its edges, which flanges will abut the wall 136 or the wall 150 during the reciprocation. A rectangular opening 156 (FIG. 2) is formed in the top of base 30 beneath assembly 102. A U-shaped bracket 158 is secured beneath opening 156 by flanges 160 which are welded to the underside of the top of base 30. Platen 108 is in turn secured in the pocket formed by bracket 158.

Platen 108 is of the same structure as the platen disclosed in my prior U.S. Pat. No. 3,869,842. Platen 108 comprises a lower steel plate 162 and two resilient plates 164 and 166. The resilient plates comprise rubber or other semi-rigid material. A sleeve 168 covers plates 162, 164 and 166. Sleeve 168 also comprises polytetrafluoroethylene impregnated fiberglass. The platen 108 is secured in place on bracket 158 by a plurality of bolts 170 (FIG. 3).

A microswitch 172 having an actuating finger 174 is secured in base 30 by bolting the same to the underside of the top of the base. The finger 174 passes through a slot 176 in the base, and is received in the slot 14. A slot 178 is also formed in plate 140 for reception of the finger 174 when the finger is moved toward the rear of the device, as will be explained hereinafter. A time delay relay 180 is mounted on base 30 within housing 12 (FIG. 2). A heat rheostat 182 (FIG. 4) is mounted on rear wall 20.

Figure 9:
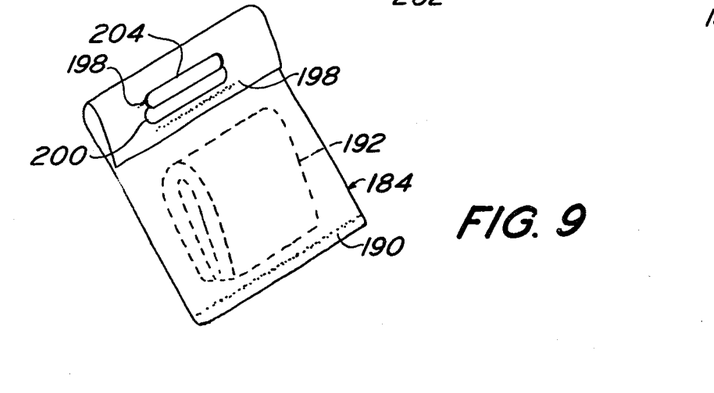
FIG. 9 is a perspective view of the plastic bag of this invention, with a commodity sealed therein.

The device of this invention is used for sealing the top of a plastic bag and for forming a handle thereon. Any of the plastic bags known to the art can be used in connection with this invention. By way of example, as seen in FIGS. 1 and 9, the plastic bag 184 includes a front wall 186, a rear wall 188 and a closed bottom, which can be formed by a heat seal 190.

Figure 8:
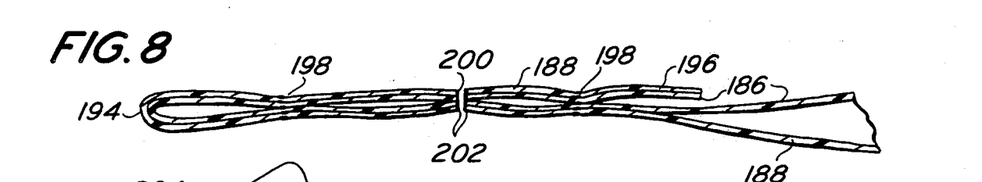
FIG. 8 is an enlarged sectional view taken along the line 8—8 of FIG. 1.

In using the device of this invention, a commodity is placed in the bag 184. The commodity, which is schematically shown at 192 in FIG. 9, can comprise any item of vended merchandise, such as a sweater, pants, a blouse, etc. After the commodity 192 has been inserted in the bag, the top of the bag is folded over, leaving a fold line 194, and forming a flap 196 (FIG. 8). Thus, the flap will result in the bringing of a portion of front wall 186 into contact with the top of front wall 186.

After the flap 196 has been formed, the bag, with the commodity therein, is slid into the slot 14 in housing 12. Since the bag is wider than the housing 12, it can be grasped by both sides and slid into the slot. When the bag is slid into the slot, and pushed to the rear of the slot, it will contact finger 174 (FIG. 2) of microswitch 172, thereby closing the microswitch. This in turn will actuate the relay 180, which will in turn actuate solenoid 46.

Referring now to FIGS. 2 and 6, when the solenoid 46 is actuated, it will move the plunger 48 to the left, as viewed in FIG. 2. Since the stud 52 (FIG. 6) is secured to the plunger via ears 50 and bolt 54, the stud will be moved along with the plunger.

The pin 56 of stud 52 passes through slot 58, which acts as a guide for the downward movement of the pin. Since the pin is secured in plate 62, it will rotate plate 62 in a counter-clockwise direction about pin 60 when it is moved downwardly. The final position for the pin 56 is shown in phantom in FIG. 2.

When the pin 56 is moved to the position shown in phantom at 56' in FIG. 2, the plate 62 will be rotated downwardly. Since the bar 82 is secured to plate 62 by pin 78, the rotational movement of plate 62 will cause bar 82 to move vertically downward, with the path of movement of the bar being guided by the plates 136 and 150. Thus, when the bar 82 is moved downwardly, it will force heating and cutting assembly 102 downwardly.

Continued downward movement of the bar 82 will initially bring wire 132 into contact with the flap 196 of bag 184. In this connection, as seen in FIG. 2, the wire 132 is in a slightly lower horizontal plane than the plane of the bottom of heat sealers 104. The wire 132 will then be forced into and through the flap 196 and the remainder of the bag. It should be noted that at the same time the relay 180 is actuated, the heat sealer bars 104 and the wire 132 are energized, thereby heating them. Thus, the wire 132 is hot when it contacts the bag. Accordingly, the wire will melt through the bag as it is forced downwardly.

Continued downward movement of bar 82 will move block 126 containing wire 132 vertically upward, against the urging of spring 130. This permits the engagement of the heat sealer bars 104 with the bag. The assembly 102 is kept in contact with the bag for a sufficient period of time to permit the formation of spaced heat seals 198 (FIG. 1) and the cutting of the partial loop 200 in the top of the bag. After a predetermined amount of time, which time will be sufficient to cause the formation of the heat seals 198 and the cutting of the loop 200, the relay will cause the opening of the solenoid and heating circuits. This will return the plunger 48 of the solenoid to the position wherein the pin 56 will be in the position shown in full line in FIG. 2, and will cease the heating of the heat sealers 104 and the wire 132. When the solenoid is returned to its original position, the bag 184 is then removed from the housing 12.

The condition of the bag, when sealed, is shown in FIG. 8. As seen therein, heat seals 198 seal the flap 196 to the remainder of the bag, thereby forming a seal which passes through all four plies of plastic. Likewise, because the partial loop 200 is heat cut, rather than being die cut, the flat wire 132 will form a heat seal 202 at opening 200. Here again, all four plies of the bag are sealed together by the heated wire 132 when the partial loop 200 is cut.

Referring to FIG. 9, it is seen that after the bag has been sealed and the loop has been cut, the partially removed plastic 204 can be pushed through the bag and folded upwardly, as seen in FIG. 9. A hand can then be inserted through the opening, and the opening serves as a handle to carry the bag. The folded-up portion 204 provides a comfortable carrying handle. Since the edge of the portion 204 has been sealed by the wire 132, it will not separate when the bag is carried.

Figure 7:
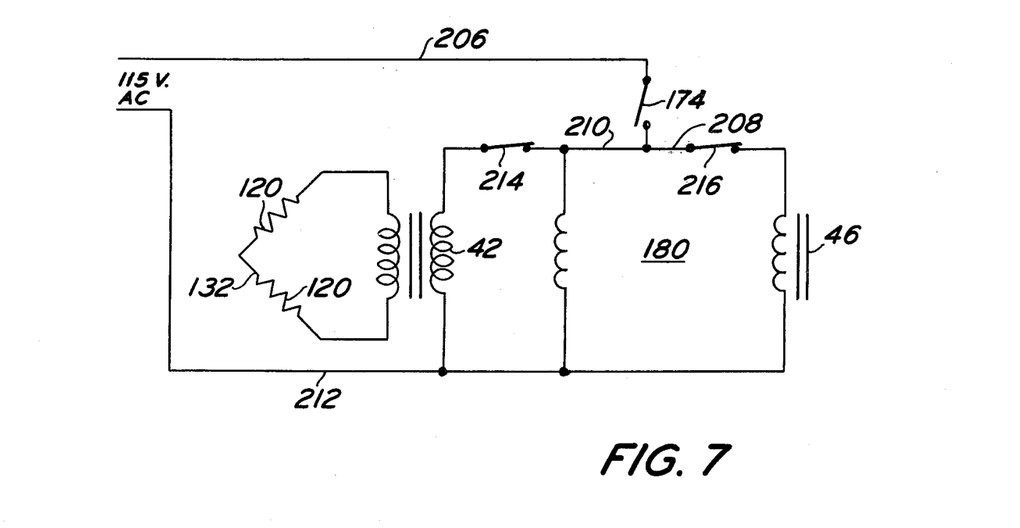
FIG. 7 is a schematic circuit diagram of the electrical components of the apparatus.

A schematic wiring diagram is shown in FIG. 7. As seen therein, a conventional 115 volt a.c. power source is provided, such a wall receptacle. The time delay relay is shown at 180, and the finger 174 is shown as being a part of a normally opened switch. When the finger 174 is depressed by the insertion of a bag, the switch of which finger 174 is the contactor will be closed. This completes a circuit through line 206, line 208 and solenoid 46, thereby energizing the solenoid. This will in turn rotate plate 62 counter-clockwise, as viewed in FIG. 2, thereby bringing the assembly 102 into contact with the inserted bag.

At the same time the circuit through the solenoid is closed, a second circuit is closed through line 206, switch 174, line 210, transformer 42 and line 212. When this latter circuit is completed, heater ribbons 120 and wire 132 will all be energized, thereby furnishing heat for the sealing and cutting operation. After a predetermined amount of time, switches 214 and 216 of time relay delay 180 will automatically open. This will open the circuit through the solenoid 46 and the circuit through the transformer 42, thereby returning the plunger 48 of the solenoid to its original position and terminating the supply of heat to the heat sealers and cutting wire 132. Thereafter, the bag is removed from the housing 12 and the switch including finger 174 is again opened. The switches 214 and 216 of the relay 180 are again closed, and the device is ready to receive another bag for sealing the same and cutting the handle. Tension spring 92 (FIG. 2) aids in returning plate 62 to the position shown in FIG. 2 at the time the solenoid is being returned to its at-rest position. The rheostat 182 (FIG. 4) is used for varying the intensity of the heating ribbons 120 and the wire 132, in a manner well known to the art.

The bag of this invention can be made from any of the thermoplastic materials known to the art. Polyethylene is a preferred material, and more particularly, high density polyethylene. The polyethylene can be transparent or translucent. In the embodiment shown in FIG. 9, translucent high density polyethylene has been used. Low density polyethylene can also be used for the bag of this invention.

The handle formed according to this invention has been found to be at least three times as strong in shear strength as a similar shaped die cut handle. The reason for this is that four plies of plastic are heat sealed together by the apparatus and method of this invention, and this distributes the load across all four plies of plastic. In the prior art die cut handles, each wall of the bag operates independently of the other to support the load, and this is not nearly as strong as the handle formed by the instant invention.

One of the reasons for the increased strength is that the shear forces in the bag of this invention occur at the center of the end loops formed by cut 200 (FIGS. 1 and 9). Accordingly, these forces are transmitted outwardly, and since four plies of plastic are united by bead 202 (FIG. 8), the four plies together absorb the shear forces. Contrasted with this, in a die cut, unsealed handle the shear forces project perpendicularly to the two upper termini of the cut 200, or in the position of termini 134 (FIG. 4) of the wire 132. Accordingly, when the die cut bag is held, the shear forces occur at these termini and there is no resistance to tearing of the bag, other than whatever shear strength is in the plastic of the bag.

It has been found that merely heat sealing the cut 200 by bead 202 increases the shear strength of the bag, even without the provision of lateral seals 198. However, when the lateral seals are used, the shear strength is substantially increased. In addition to increasing the shear strength of the handle, the lateral seals 198 also serve the function of sealing the bag. Thus, once the bag has been sealed, it will not be possible for a customer of the store to attempt to steal other objects from the store and place them in the sealed bag without first breaking the seal. If the seal is broken, the security guard at the store will readily notice this. If the lateral seals 198 were not used, it could be possible for a customer to break the seal 202 and insert other items in the bag without the security guard readily noticing this. If desired, where weight of the packaged article is not a problem, only a single line seal 198 can be used to prevent shoplifting.

Where an extremely wide bag is being used, and it is desired to prevent shoplifting, two or more handle seals can be formed at the top of the bag. Thus, even though the center seal will be used as a carrying handle, the seals on either or both sides of the center handle can be used to prevent shoplifting.

Where lighter items are to be placed in the bag, the top seal and handle can be formed without utilizing a flap 196. Thus, the bag can be inserted in the device 10 without forming the flap, and accordingly the handle will be formed through only two plies of plastic, instead of four. Likewise, the seals 198 will pass through only two plies of plastic. The flap is particularly advantageous when heavier items are packed in the bag 184.

The plastic of the bag of this invention can be of any of the thicknesses normally used in packaging merchandise. This would normally be in the range of 1 to 5 mils, although, obviously, greater thicknesses can be used. As is well known in the art, the plastic of the bags can be printed with the name and trademark or service mark of the store.

The method aspect of this invention includes the steps of the insertion of a commodity 192 into the bag, the folding of the flap 196, the formation of the spaced lateral heat seals 198 and the formation of the heat-sealed and cut flap 204 to provide a slot for carrying the bag.

The apparatus of this invention is compact and is relatively light in weight, such that it may be relocated easily. This enables the apparatus to be used wherever desired in a retail sales establishment, such as at a sales desk, a check-out counter, a bagging station, etc.

The apparatus is effective to place a handle on a bag and seal the same in a few seconds, and accordingly will not slow down the merchandise check-out process.

Although a solenoid has been described as the mechanism for actuating the vertical reciprocation of the heat sealing and cutting assembly, it should be understood that other means known to the art can be used for carrying out this operation. By way of example, the motor and crank assembly of U.S. Pat. No. 3,869,842 can also be used.

The teachings of this invention can be applied to any plastic bag known to the art, and not just the specific bag shown in FIG. 9. The bottom of the bag can be gusseted, or can comprise a closed loop, rather than the bottom line seal 190.

In addition to packaging commodities at a point of purchase, the teachings of this invention can also be used for the pre-packaging of various commodities and sealing the bag. Thus, such items as candy, gum, etc., can be pre-packaged in a plastic bag and the bag can then be sealed to form the handle described above. The pre-packaged goods can then be suspended for subsequent vending, as from pegboard hardware. Other commodities can also be packaged in a like manner, such as grass seed, potting soil, etc.

Without further elaboration, the foregoing will so fully illustrate my invention, that others may, by applying current or future knowledge, readily adapt the same for use under various conditions of service.

What is claimed as the invention is:

1. A method of packaging a vended commodity in a pre-formed plastic bag, said plastic bag being formed from a thermoplastic material, said bag comprising a front wall, a rear wall and a closed bottom, comprising placing the vended commodity in said bag, and forming an opening in the top of said bag after said vended commodity has been placed therein, said opening being formed by heat cutting said opening, said heat cutting removing a portion of said front wall and said rear wall, and heat sealing said front wall to said rear wall at said opening.

2. The method of claim 1 and further including placing at least one laterally extending heat seal on said bag, said laterally extending heat seal joining said front and rear walls.

3. The method of claim 1 and further including the step of placing spaced laterally extending heat seals on said bag, said spaced heat seals joining said front wall to said rear wall, with one of said spaced heat seals being positioned below said opening and the other of said spaced heat seals being positioned above said opening.

4. The method of claim 1 wherein the means for heat cutting said opening is in the shape of a partial loop, whereby the portion of said walls heat cut at said opening remain secured to said bag and serves the function of providing a comfortable carrying handle for the bag.

5. A method of packaging a vended commodity in a pre-formed plastic being, said plastic bag being formed from a thermoplastic material, said bag comprising a front wall, a rear wall and a closed bottom, comprising placing the vended commodity in the bag, forming a flap from said front and rear walls after the vended commodity has been placed in the bag, folding said flap against one of said walls, forming an opening in the top of said bag by heat cutting said opening, said heat cutting removing a portion of said front wall, said rear wall and the two walls forming said flap, and heat sealing said front, rear and flap walls at said opening.

6. The method of claim 5 and further including the step of placing laterally extending heat seals on said bag, said spaced heat seals joining said front, rear and flap walls, with one of said spaced heat seals being positioned below said opening and the other of said spaced heat seals being positioned above said opening.

7. The method of claim 5 and further including the step of placing at least one laterally extending heat seal on said bag, said laterally extending heat seal joining said front, rear and flap walls.

8. The method of claim 5 wherein the means for heat cutting said opening is in the shape of a partial loop, whereby the portion of said walls heat cut at said opening remains secured to said bag and serves the function of providing a comfortable carrying handle for the bag.

* * * * *